United States Patent [19]

Takebayashi et al.

[11] Patent Number: 5,957,368
[45] Date of Patent: Sep. 28, 1999

[54] METHOD OF CONTINUOUSLY HOT ROLLING STEEL PIECES

[75] Inventors: Katsuhiro Takebayashi; Yoshikiyo Tamai; Toshio Imae; Kunio Isobe; Hideyuki Nikaido; Koichi Uemura, all of Chiba, Japan

[73] Assignee: Kawasaki Steel Corporation, Kobe

[21] Appl. No.: 08/793,845

[22] PCT Filed: Jan. 12, 1996

[86] PCT No.: PCT/JP96/00034

§ 371 Date: Mar. 10, 1997

§ 102(e) Date: Mar. 10, 1997

[87] PCT Pub. No.: WO97/02907

PCT Pub. Date: Jan. 30, 1997

[30] Foreign Application Priority Data

Jul. 13, 1995 [JP] Japan ................................. 7-177398

[51] Int. Cl.$^6$ .................................................. B23K 28/02
[52] U.S. Cl. ............................ 228/171; 228/13; 228/170
[58] Field of Search ........................... 228/170, 171, 228/13

[56] References Cited

U.S. PATENT DOCUMENTS

| 3,915,368 | 10/1975 | Ulmer ....................................... 228/13 |
| 5,205,468 | 4/1993 | Büdenbender .......................... 228/170 |

FOREIGN PATENT DOCUMENTS

| A 56-27719 | 3/1981 | Japan . |
| A 56-119311 | 9/1981 | Japan . |
| A 58-122109 | 7/1983 | Japan . |
| A 62-234679 | 10/1987 | Japan . |
| A 4-89120 | 3/1992 | Japan . |
| A 5-185111 | 7/1993 | Japan . |
| A-6-39405 | 2/1994 | Japan . |
| A-6-234005 | 8/1994 | Japan . |
| A-7-24627 | 1/1995 | Japan . |
| A-7-80510 | 3/1995 | Japan . |
| A 7-251203 | 10/1995 | Japan . |

*Primary Examiner*—Patrick Ryan
*Assistant Examiner*—Jeffrey T. Knapp
*Attorney, Agent, or Firm*—Oliff & Berridge, PLC

[57] ABSTRACT

A continuous hot rolling method is available for continuously hot finish rolling steel pieces. The trailing end of a preceding steel piece and the leading end of a succeeding steel piece are cut by a drum shear which sandwiches the steel piece between its upper drum and lower drum, having cutting blades on the peripheries of the drums. The cut ends are heated to raise the temperatures thereof by high-frequency induction heating, pressed against each other to butt-join the cut ends. The joined steel pieces are then supplied to a rolling equipment. The trailing end of the preceding steel piece and the leading end of the succeeding steel piece are cut individually by two pairs of the cutting blades. One pair of the cutting blades has the obverses of the blades oriented in opposite directions in the obverse side and the reverse side of the steel piece. The other pair of cutting blades has the obverses of the blades oriented in the opposite directions relative to the former pair of cutting blades, while each steel piece is transferred to the same direction. The method according to the invention significantly reduces the displacement produced when the steel pieces are joined by applying transverse-type high-frequency induction, thereby realizing stable continuous hot rolling with no breakage of the rolled plate.

5 Claims, 17 Drawing Sheets

FIG_3
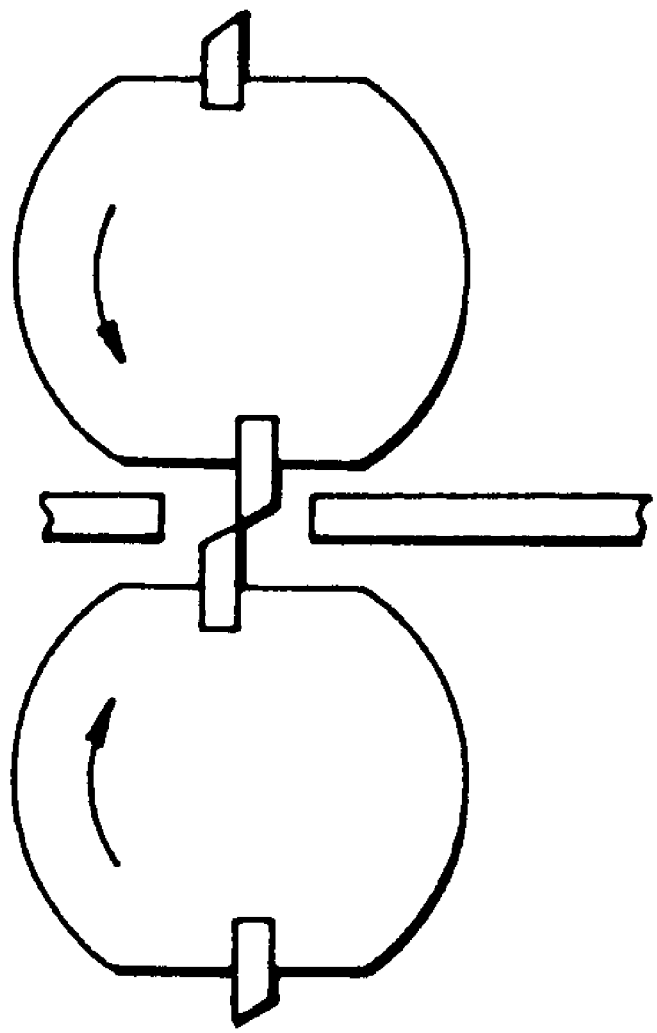

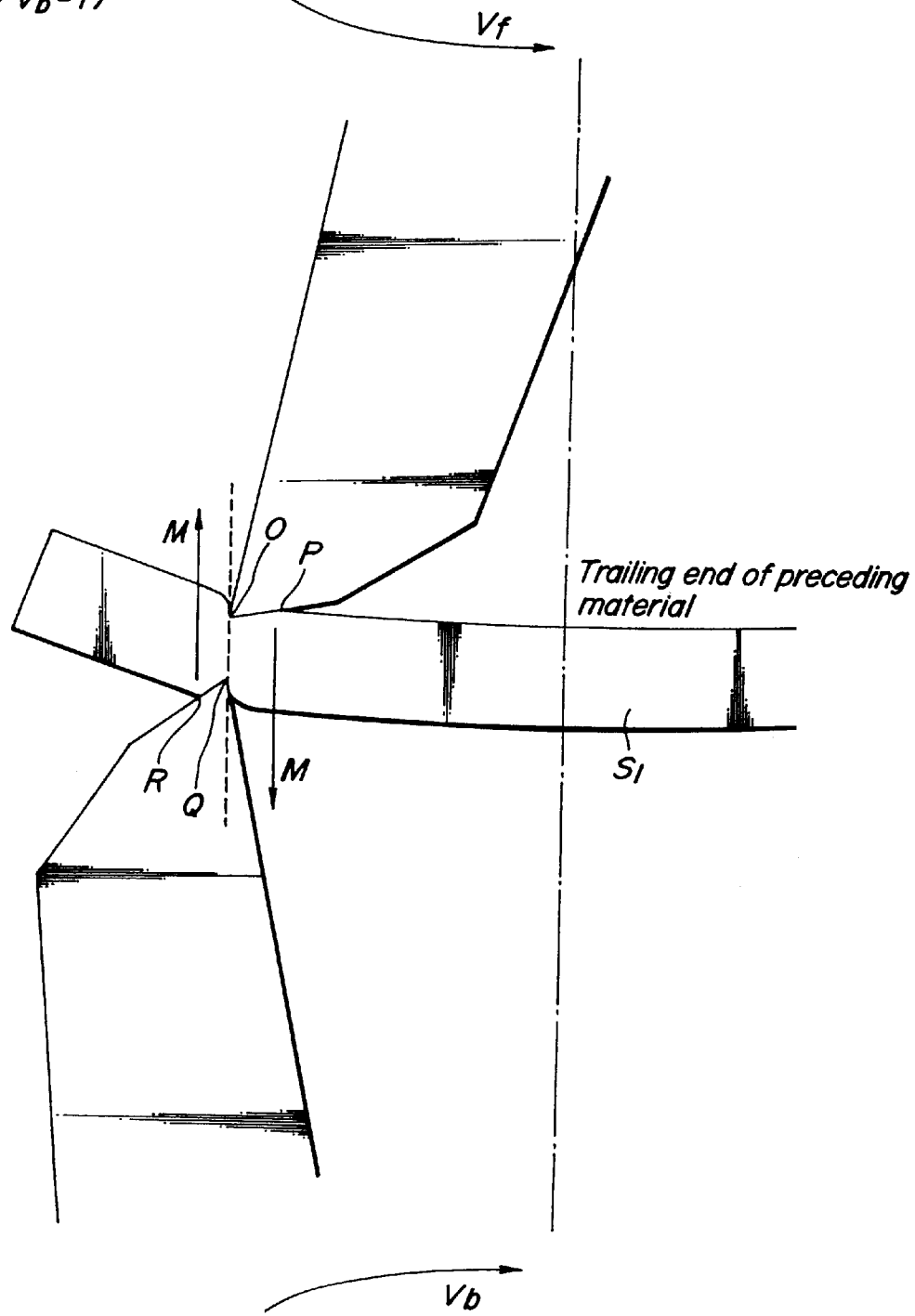
FIG_4

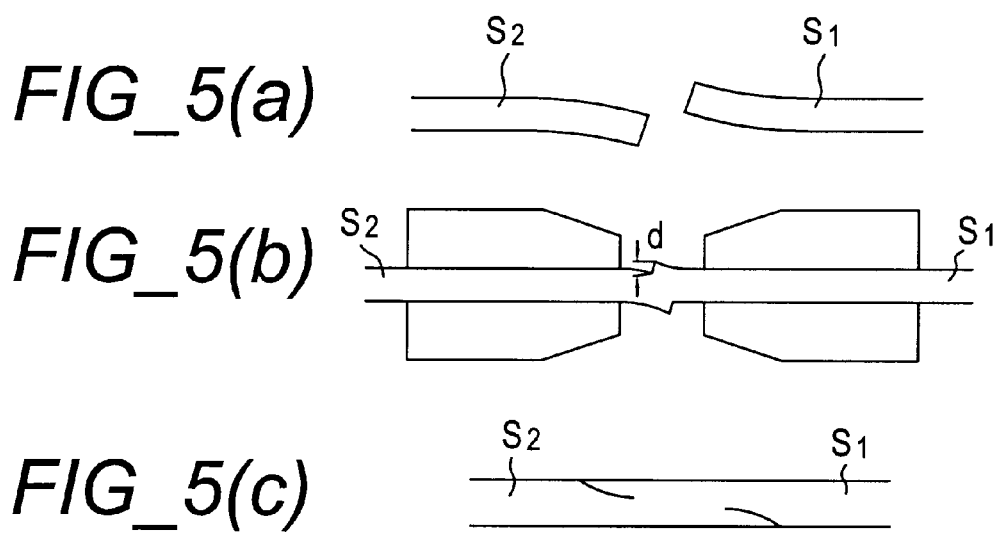

FIG_6
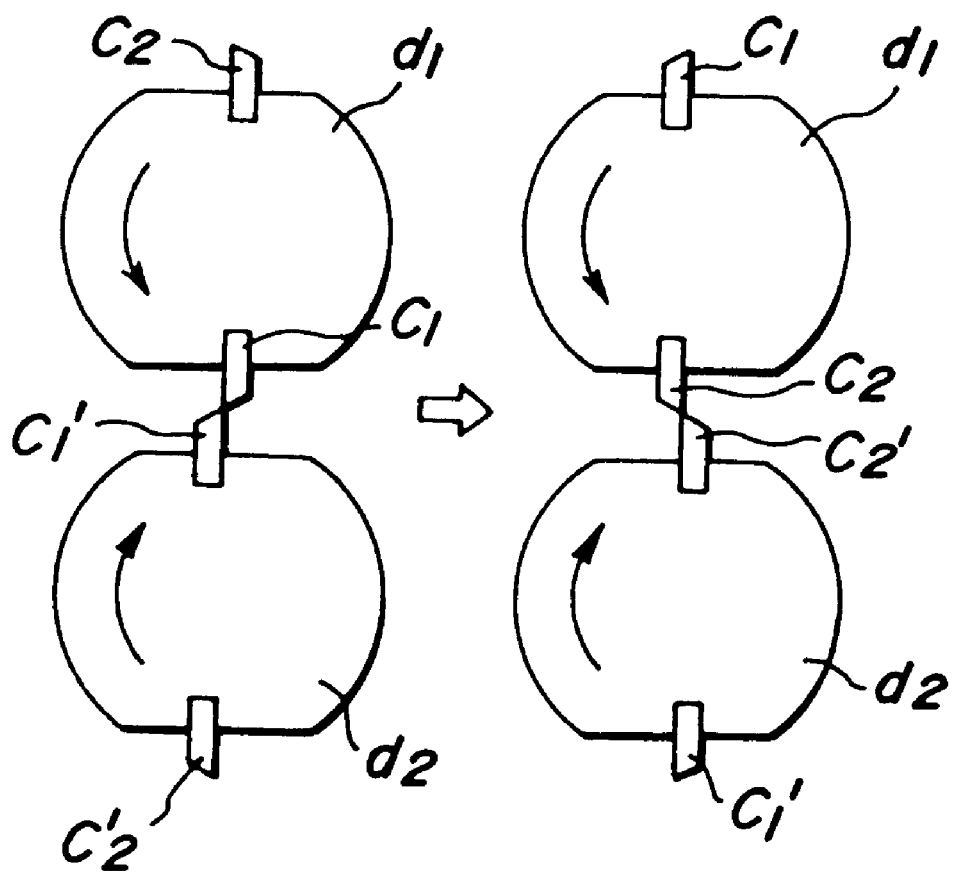

FIG_7(a)
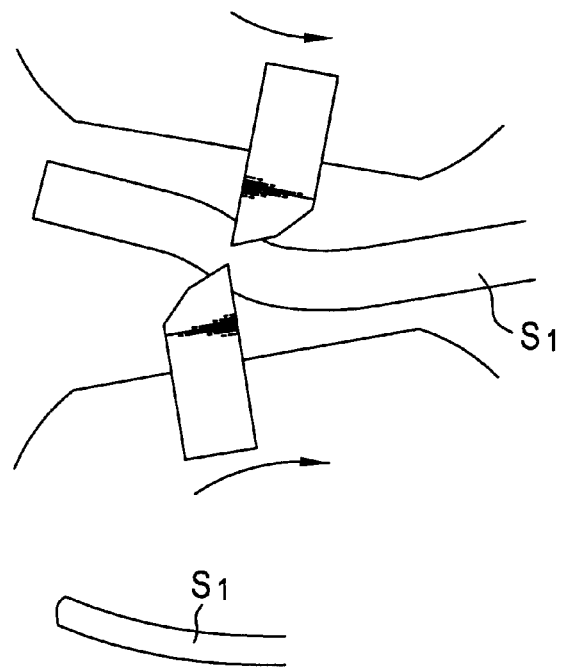
FIG_7(b)
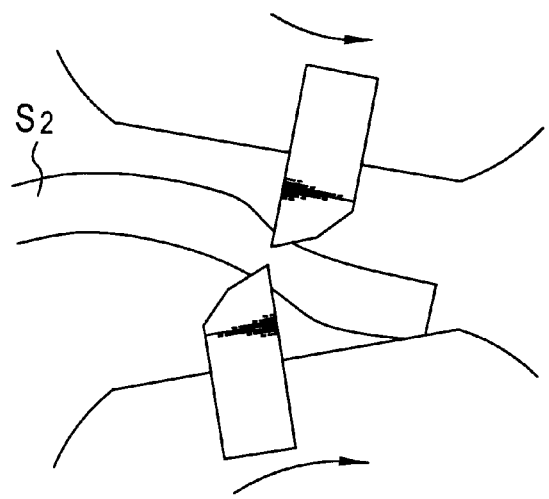
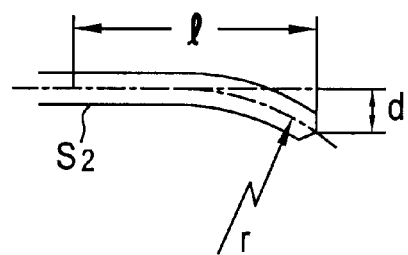

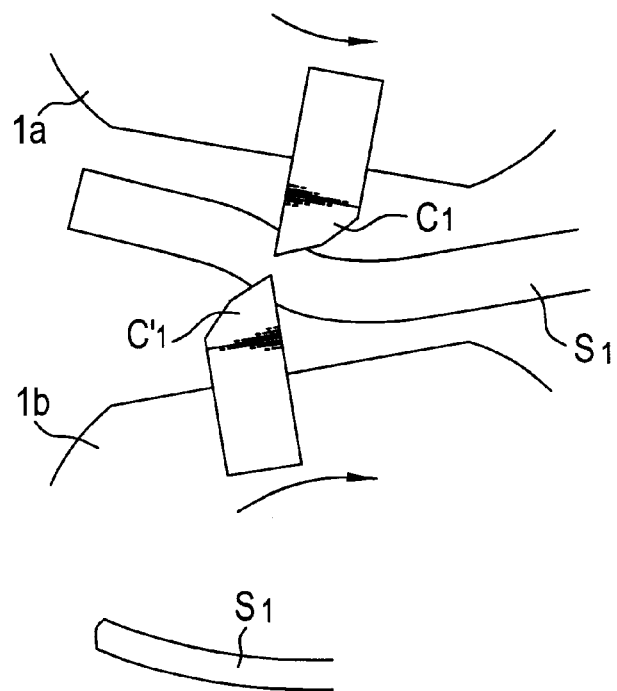
FIG_8(a)
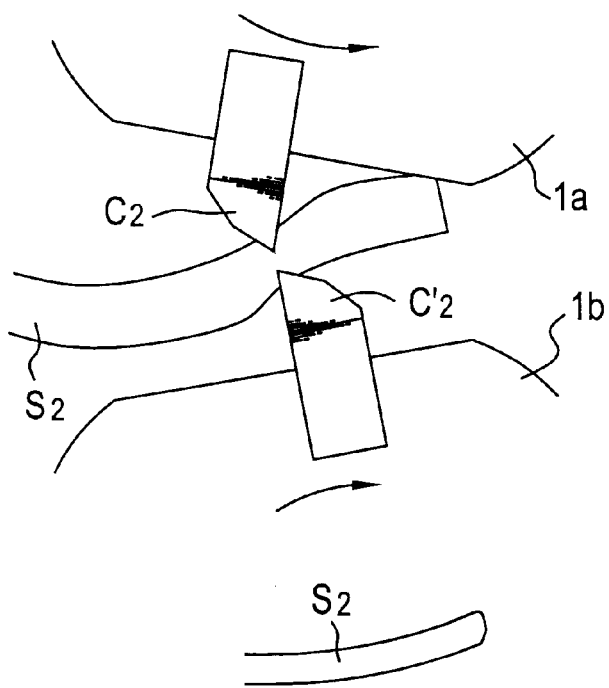
FIG_8(b)

FIG_9(a) 
FIG_9(b) 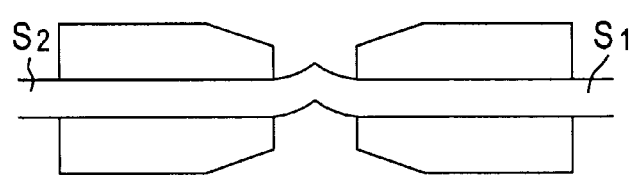

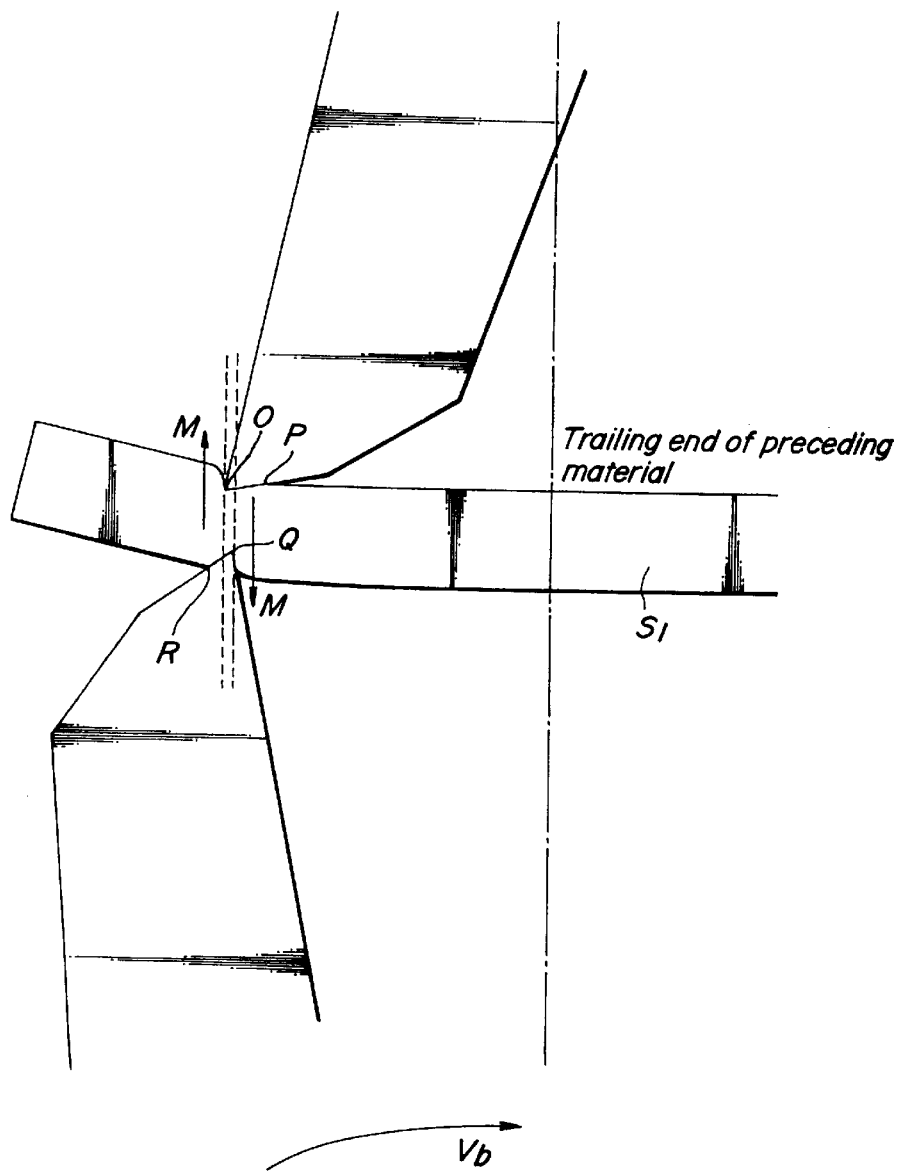
FIG_10

FIG_11
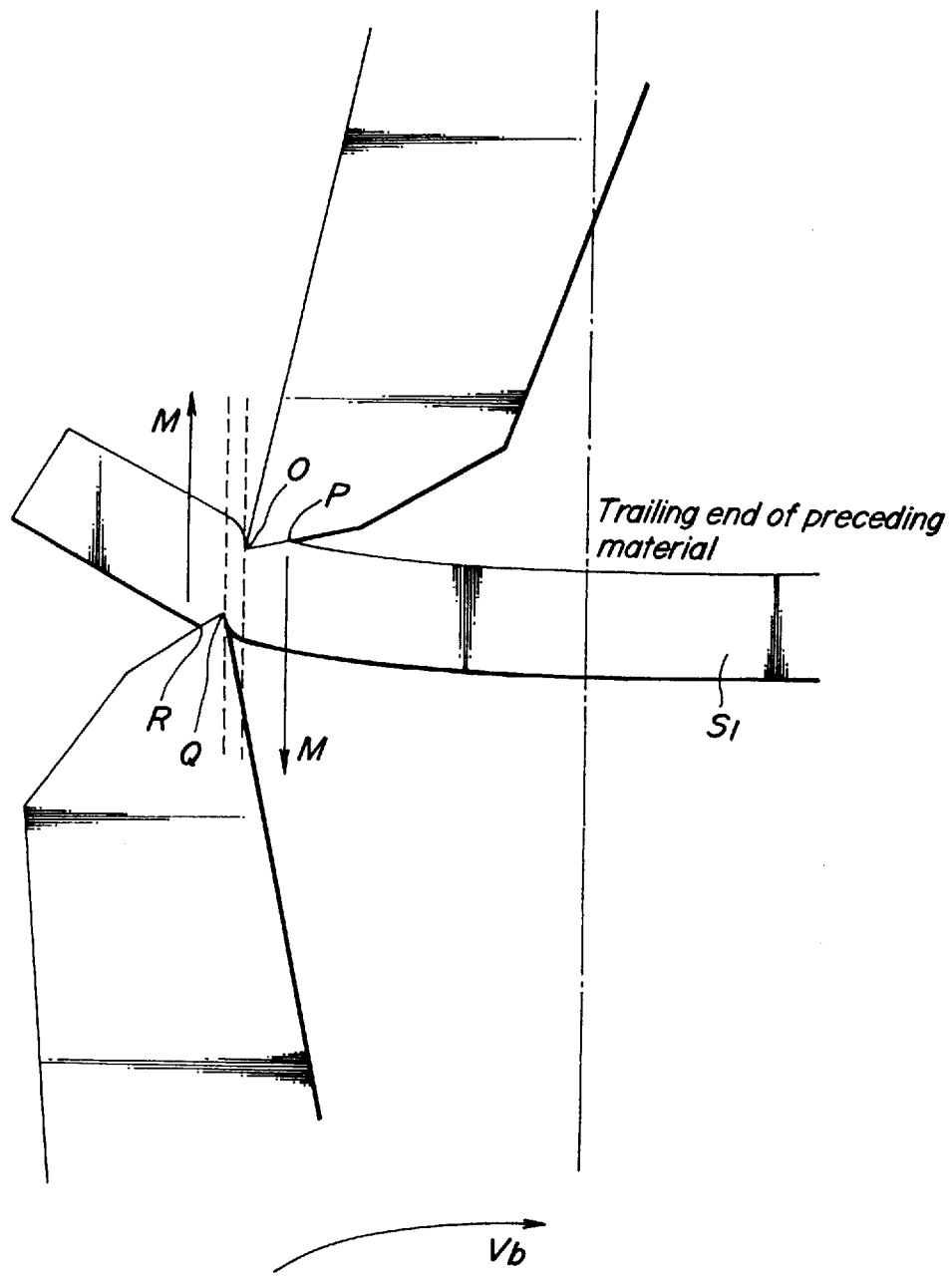

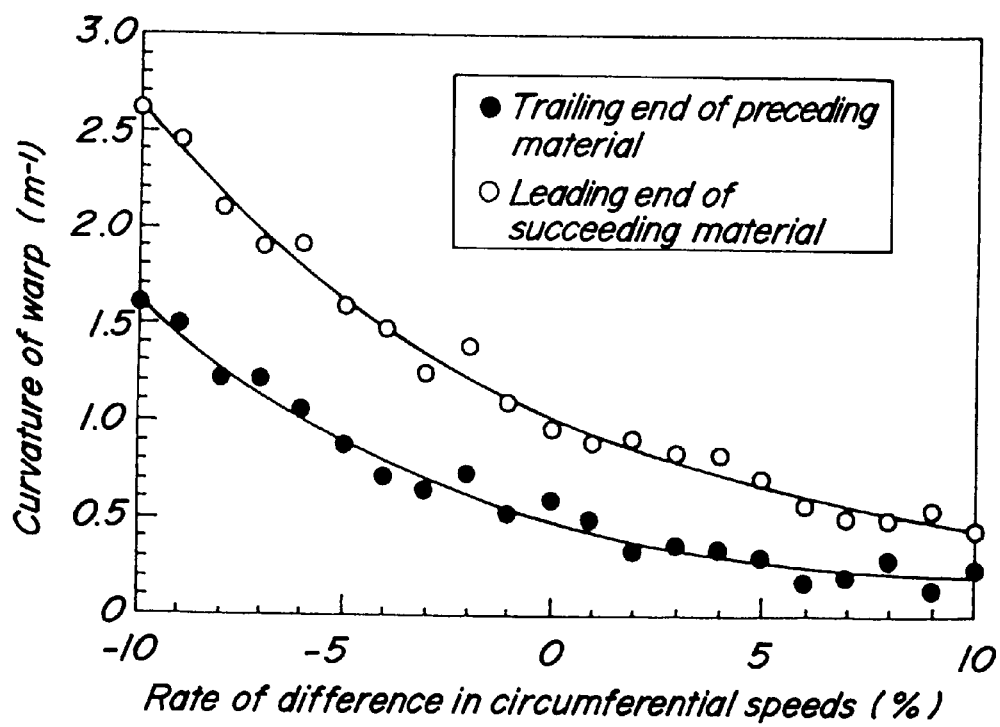
FIG_12

FIG_13
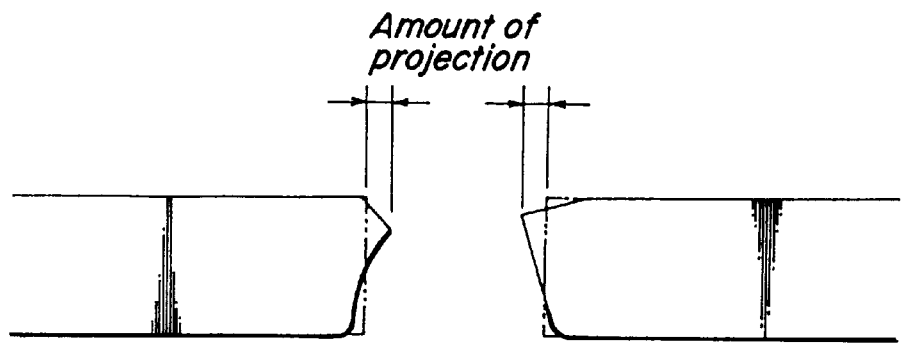
FIG_14
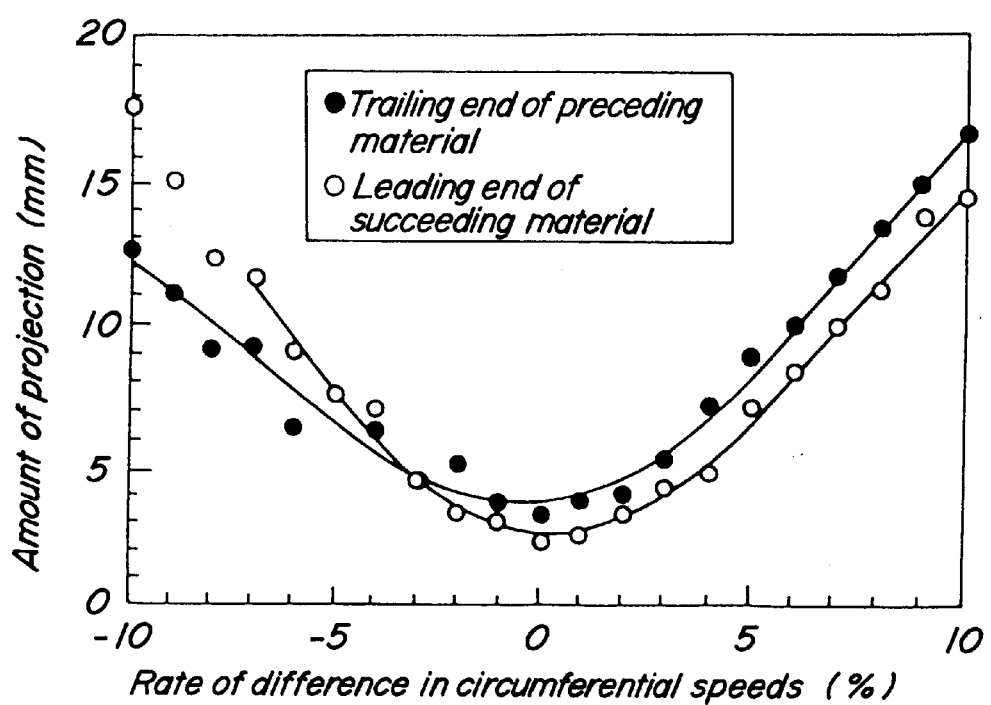

FIG. 15
(a) Same circumferential speed  
(b) Different circumferential speed  

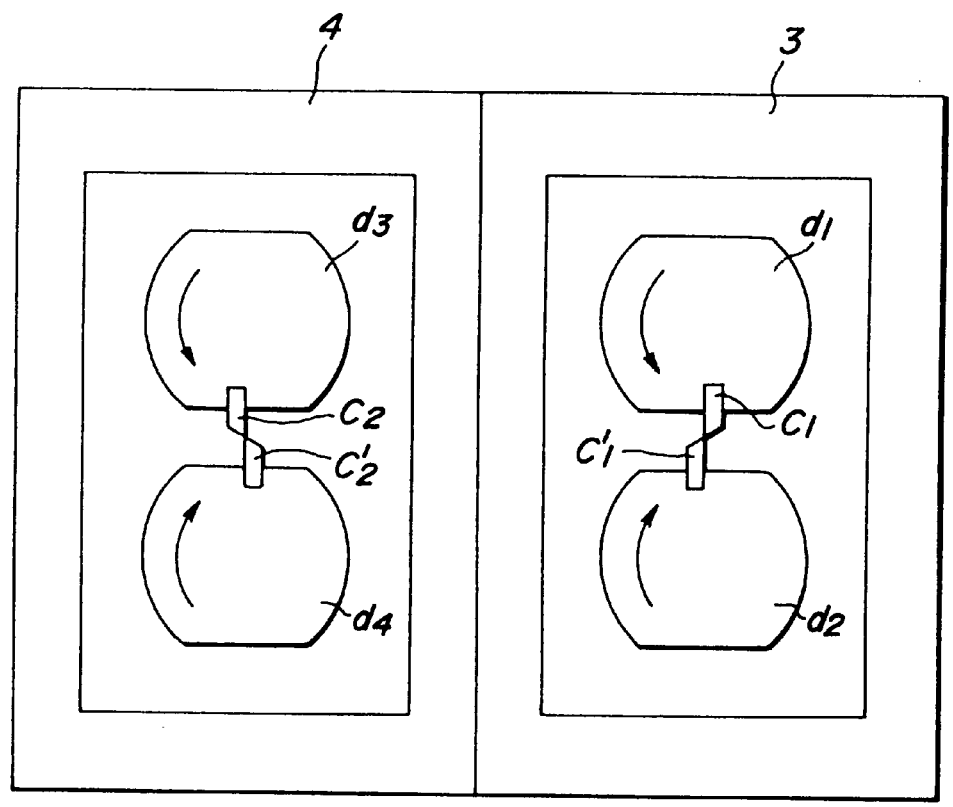
FIG_16

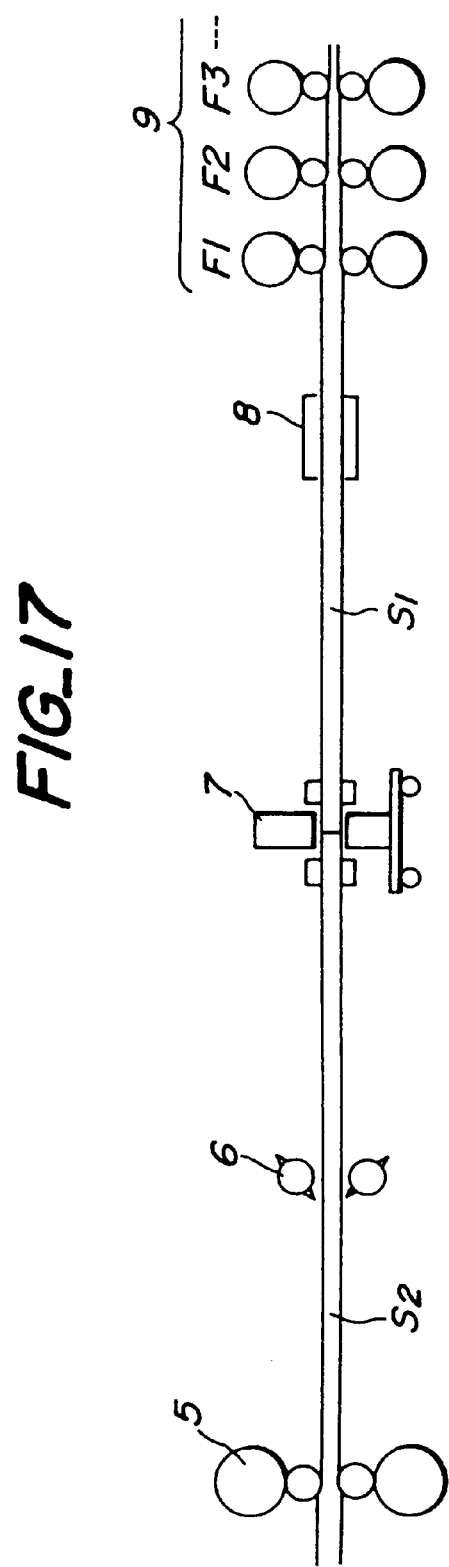
FIG_17

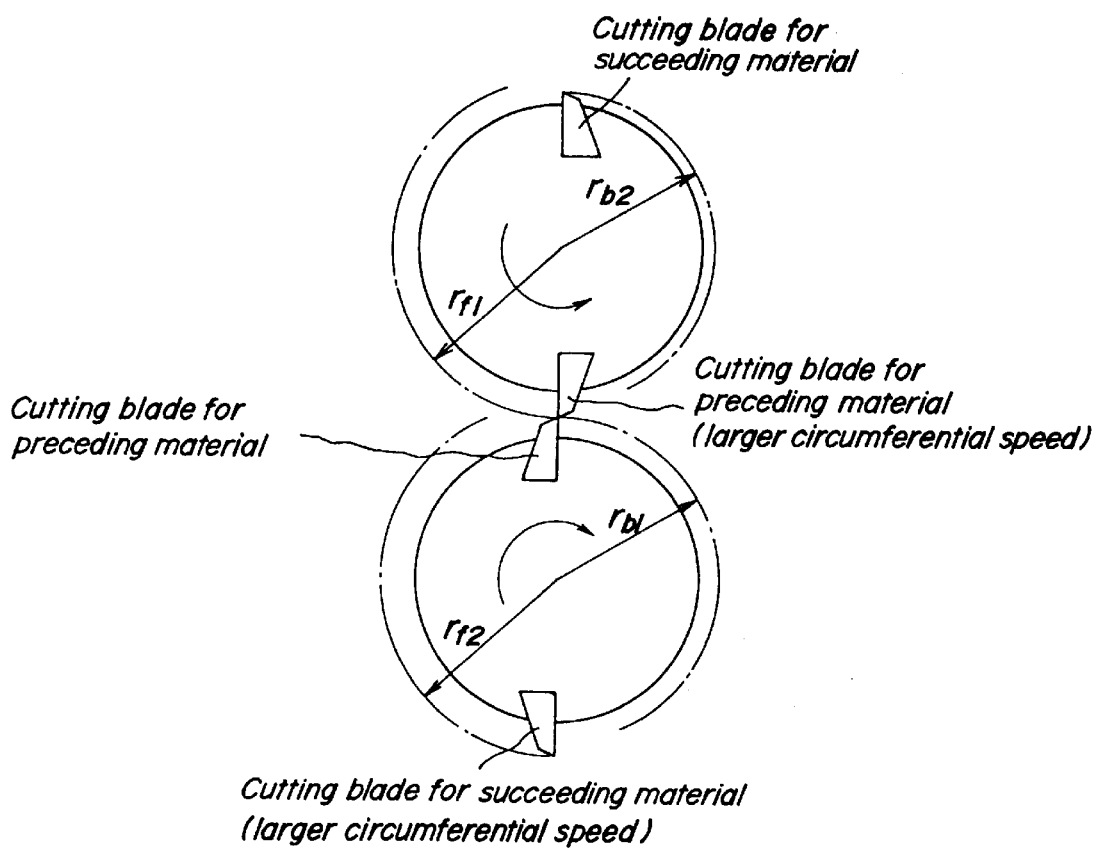
FIG_18

METHOD OF CONTINUOUSLY HOT ROLLING STEEL PIECES

TECHNICAL FIELD

The present invention relates to a method for joining and continuously hot rolling several to dozens of steel pieces, such as sheet bars, slabs, billets, blooms or the like.

BACKGROUND ART

In a batch type hot rolling line in which a steel piece is individually heated and rolled by a roughing mill and a finishing mill to make a steel sheet of a desired thickness, a line stop tends to occur because the rolled material does not successfully bite into a gap defined by the upper and lower rolls and faulty shapes of the leading and the trailing ends of the rolled material will considerably lower the product yield.

Therefore, an improved rolling method (endless rolling method) has been adopted in recent years in which the trailing end of a steel piece to be rolled is joined to the leading end of the succeeding steel piece to be rolled before the finish rolling and the resulting steel piece is continuously supplied to a hot rolling line.

In this respect, reference may be had to Japanese Unexamined Patent Publication No. 58-122,109 which describes a method wherein the trailing end of a preceding steel piece is butt-joined to the leading end of a succeeding steel piece over the entire area of the end plane thereof, before they are rolled. Also, Japanese Unexamined Patent Publication No. 4-89,120 describes a method in which the trailing end of a preceding steel piece is arranged against the leading end of a succeeding steel piece with a gap on the entry side of a hot finishing mill equipment and in this area an alternate magnetic field is applied to the steel pieces in their thickness direction to heat them and raise the temperatures thereof by induction heating and then both steel pieces are joined by pressing.

In such continuous hot rolling of steel pieces, a cutting step is added as a preparatory step for the joining process, in which defective portions at the leading and the trailing ends of the steel piece are cut by a crop shear, drum shear or the like. In the cutting step, however, there may be instances wherein the leading end and/or the trailing end of the steel piece tend to warp upward or downward. As a result, the steel pieces may be joined with an upward or downward displacement (hereinafter referred to as "displacement"), as they are pressed against each other.

In this respect, the reason why the end of the steel piece warps in the cutting step is that a moment is produced in the cut plane when the end of the steel piece is cut by a crop shear. Usually, the preceding steel piece and the succeeding steel piece are cut by the same cutting blade so that they warp in opposite directions. If the steel pieces are heated to raise their temperatures and pressed in such a condition, they tend to further warp upward and downward to substantially decrease the effective joint area. This tends to cause the demerit that the steel pieces are broken in the following finish rolling process at the joined portion. In particular, when a transverse-type induction heating is used as heating means and an alternate magnetic field is applied to the steel pieces in their thickness direction for heating them by induction heating, due to the requirement for the installation space of the heating coil, a clamp for sandwiching the steel pieces must be used at a location which is remote from the ends of the steel pieces. As a result, it has been considered that the influence of the warp in the pressing process of the steel pieces would be more significant by using a clamp having a pair of upper and lower jaw elements which extend toward the ends of the steel pieces.

Furthermore, Japanese Unexamined Patent Publication No. 5-185,111 describes a cutting device having a structure wherein two pairs of upper and lower drums are arranged along the transfer direction of the rolled material and respectively rotated in opposite directions from each other, and cutting blades are mounted on each pair of drums and oriented in opposite directions. Also, Japanese Unexamined Patent Publication No. 56-27,719 and Japanese Unexamined Patent Publication No. 56-119,311 each describes a cutting technique in which the shear members of a drum type shear are driven at different circumferential speeds to cut the crop end of the steel piece. Moreover, Japanese Unexamined Patent Publication No. 7-251,203 describes a cutting technique in which a flying shear for cutting the end of the steel piece in a parallel surface relation is applied when a plurality of elongate steel pieces for hot rolling are joined by laser welding and are continuously hot rolled. However, even when such device and/or techniques are applied to the cutting of the steel pieces, it is still impossible to reduce the warping of the steel piece which causes the displacement at the joined portion.

It is an object of the present invention to provide a method for reducing the displacement at the joined portion of the steel pieces even when a traverse-type high-frequency induction heating is used as heating method, thereby allowing a stable continuous hot rolling to be carried out without defective joining or breakage at the joined portion.

DISCLOSURE OF THE INVENTION

The inventors have conducted thorough researches and investigations in view of the above-mentioned object and arrived at a novel recognition that it would be highly effective, for accomplishing the object, to make the trailing end of the preceding steel piece and the leading end of the succeeding steel piece warp in the same direction and, in addition, to reduce the warp amount by cutting the ends with a drum shear rotating at different circumferential speeds. The present invention is based such a recognition.

According to the present invention, there is provided a continuous hot rolling method for continuously hot finish rolling steel pieces, comprising the steps of cutting a trailing end of a preceding steel piece and a leading end of a succeeding steel piece with a drum shear which sandwiches the steel piece between its upper drum and lower drum, having cutting blades on the peripheries of the drums, heating the cut ends to raise their temperatures by high-frequency induction heating, pressing the cut ends against each other to butt-join the cut ends, and supplying the joined steel pieces to a rolling equipment, wherein the trailing end of the preceding steel piece and the leading end of the succeeding steel piece are cut individually by two pairs of the cutting blades, one pair of the cutting blades having the obverses of the blades oriented in opposite directions in the obverse side and the reverse side of the steel piece, and another pair of the cutting blades having the obverses of the blades oriented in opposite directions relative to the former pair of cutting blades, while each steel piece is transferred to the same direction.

According to the present invention, it is advantageous for each pair of cutting blades that, of the cutting blades disposed in the obverse side or the reverse side of the steel piece, the traveling speed of the cutting blades rotating with the reverse of the blade facing forward is higher than the traveling speed of the cutting blades rotating with the obverse of the blade facing forward, so that the circumferential traveling speeds of the two cutting blades are different from each other and the rate of the difference in circumferential speeds at the cutting of the steel piece is not more than 5 percent.

According to the present invention, the steel piece may be cut by one drum shear, though it may be cut by two drum shears disposed in tandem along the direction in which the steel piece is transferred.

BRIEF DESCRIPTION OF THE DRAWINGS

FIG. 3 schematically shows a conventional type drum shear.

FIG. 4 illustrates a cutting process in which the steel piece is cut under the same circumferential speed.

FIGS. 5 (a), (b), (c) illustrate a cutting condition, a joining condition and a rolled condition of a steel piece in the case of cutting a steel piece according to the conventional method.

FIG. 6 shows a cutting condition in the case of cutting a steel piece according to the present invention.

FIGS. 7 (a), (b) illustrate a cutting condition in the case of cutting a steel piece according to the conventional method.

FIGS. 8 (a), (b) illustrate a cutting condition in the case of cutting a steel piece according to the present invention.

FIGS. 9 (a), (b) illustrate a warping condition and a joining condition in the case of cutting a steel piece according to the present invention.

FIG. 10 illustrates a cutting process in which the steel piece is cut with a positive rate of difference in circumferential speeds.

FIG. 11 illustrates a cutting process in which the steel piece is cut with a negative rate of difference in circumferential speeds.

FIG. 12 illustrates the relationship between the rate of difference in circumferential speeds and the warp (curvature).

FIG. 13 illustrates the amount of the projection of the end of the steel piece after cutting.

FIG. 14 illustrates the relationship between the rate of difference in circumferential speeds and the amount of the projection of the end of the steel piece.

FIGS. 15 (a), (b) show for comparison the shape of the end of the steel piece in the case where the steel piece is cut under the same circumferential speed and the shape of the end of the steel piece in the case where the steel piece is cut under different circumferential speeds.

FIG. 16 shows another example of the structure of a drum shear suitable for carrying out the present invention.

FIG. 17 shows an arrangement of a continuous hot finish rolling equipment.

FIG. 18 schematically shows a drum shear used in the inventive example 3 of the embodiment.

BEST MODE FOR CARRYING OUT THE INVENTION

Figure 1:
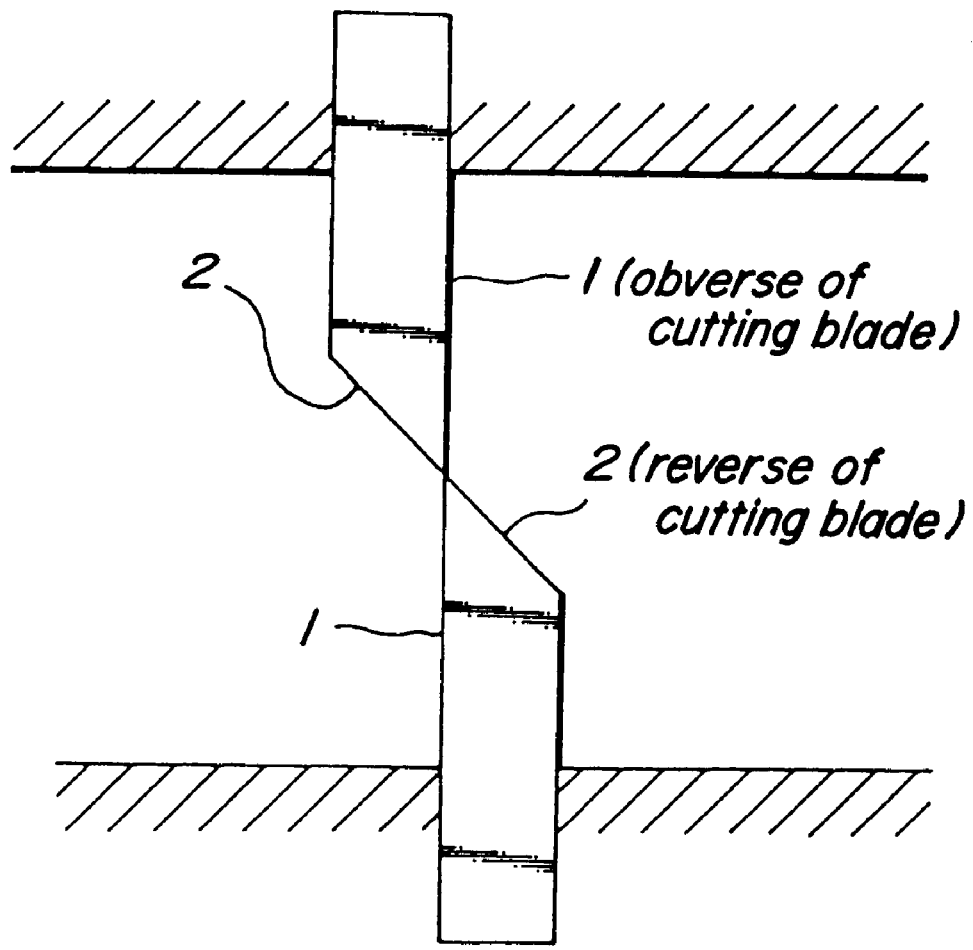
FIG. 1 shows a main portion of the cutting blades.
Figure 2:
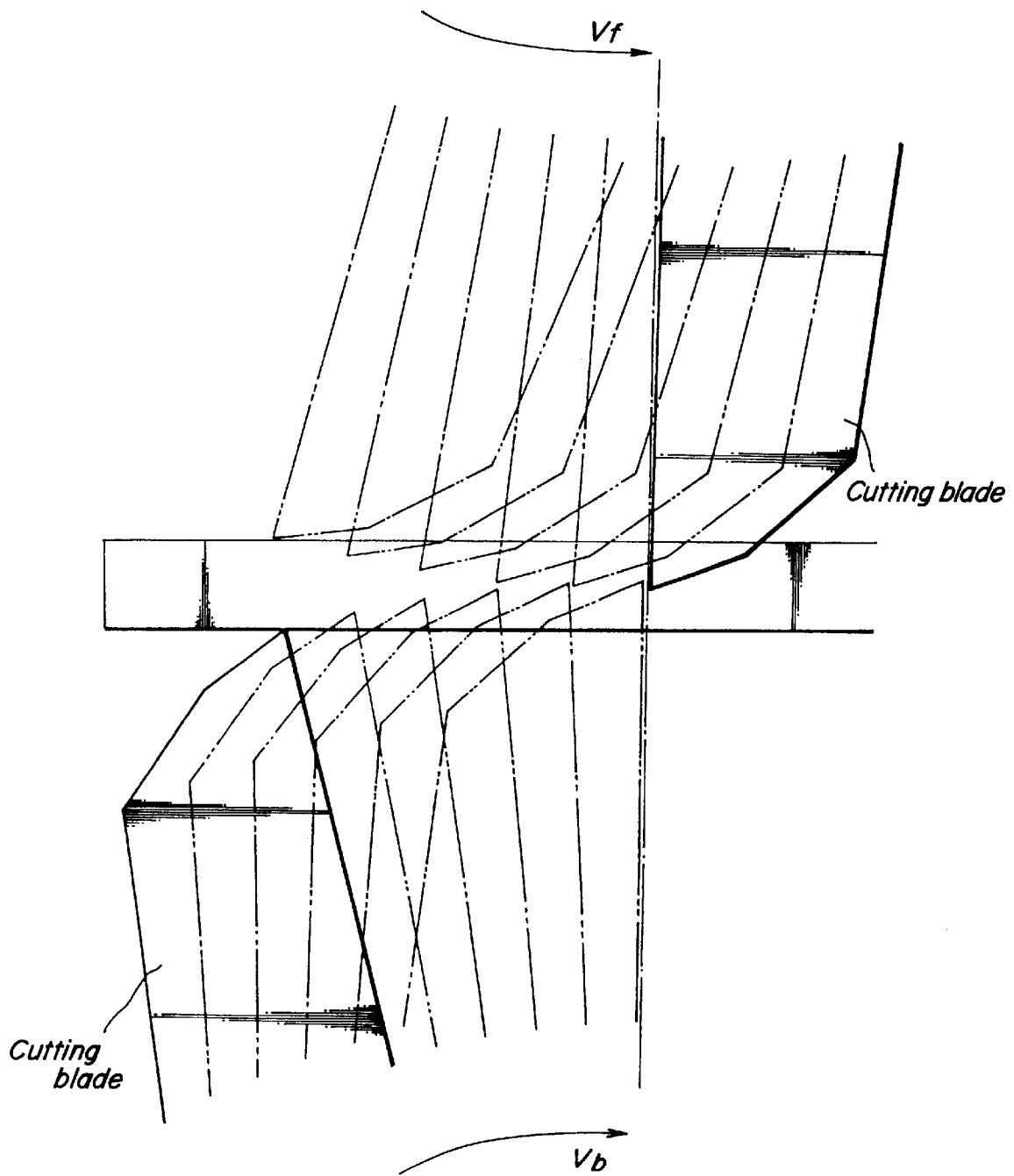
FIG. 2 shows the locus of the main portion of cutting blades when the rate of difference in circumferential speeds is positive.

Referring now to the drawings, FIG. 1 illustrates the main part of a pair of cutting blades in the cutting process, wherein reference numeral 1 designates the obverse of the cutting blade and reference numeral 2 designates the reverse of the cutting blade. In connection with the rate f of the difference in circumferential speeds, FIG. 2 shows the tip of the cutting blade disposed on a pair of upper and lower rotating drums of a drum shear, illustrating the locus of the cutting blades when the rate of the difference in circumferential speeds is positive. The rate of the difference in circumferential speeds is expressed by the following equation:

$$f = (V_f - V_b)/V_b \times 100\%$$

where $V_f$ is the traveling speed of the cutting blade which rotates with the reverse of the cutting blade facing forward, and $V_b$ is the traveling speed of the cutting blade which rotates with the obverse of the cutting blade facing forward. The present invention will be described below in further detail with reference to the drawings.

In the conventional method shown in FIG. 3, a cutting blade is disposed over the steel piece and rotated with the reverse of the cutting blade facing forward, while another cutting blade is disposed under the steel piece and rotated with the obverse of the cutting blade facing forward. These cutting blades are rotated at the same speed (same circumferential speed) so as to cut the trailing end of the preceding steel piece and the leading end of the succeeding steel piece, respectively (FIGS. 7 (a), (b)). The cutting condition just after the cutting blades bite the steel piece when they cut it is shown in FIG. 4 (cutting of the trailing end of the preceding steel piece), wherein the characters O, Q designate the tips of the cutting blades, and planes OP, QR designate the contact surfaces with which the cutting blades come into contact when the cutting blades bite into the steel piece.

Since the contact planes OP and QR of the cutting blades are at the front and at the rear of the plane OQ in this cutting method, a bending moment M (indicated by arrows in the drawing) centering on the shear plane is produced in the steel piece so that the trailing end of the preceding steel piece S1 warps upward after the cutting. On the other hand, since the bending moment acts on the steel piece in the same direction centering on the shear plane when the leading end of the succeeding steel piece is cut, the leading end of the succeeding steel piece S2 warps downward (see FIG. 7(b)). Accordingly, the joining condition shown in FIG. 5(a) is obtained when the preceding steel piece is joined to the succeeding steel piece.

When the steel pieces warping upward and downward as described above are heated to raise their temperatures and pressed and thereby joined, they exhibit a displacement as shown in FIG. 5(b). The displaced portions overlap the base metal during the finish rolling, as shown in FIG. 5(c), thereby forming a region with a reduced thickness which may cause the rolled plate to be broken during the rolling process. Accordingly, an allowable amount of the displacement d is designed to be not more than about 10% of a finish gage, although it may slightly fluctuate depending upon the thickness of a finish gage.

According to the present invention, the trailing end of the preceding steel piece and the leading end of the succeeding steel piece are cut individually by two pairs of cutting blades, respectively. In this instance, one pair of the cutting blades has the obverses of the blades oriented in opposite directions in the obverse and the reverses side of the steel piece. Another pair of the cutting blades has the obverses of the blades oriented in opposite directions relative to the former pair of cutting blades. Accordingly, the warping direction of the preceding steel piece is the same as the warping direction of the succeeding steel piece. It is thus possible to significantly reduce the displacement at the joined portion.

FIG. 6 shows a drum type crop shear which is suitable for carrying out the present invention. The illustrated crop shear comprises drums $d_1$, $d_2$ disposed on the obverse side and the reverse side of the steel piece, and cutting blades $c_1$, $c_{1'}$, $c_2$, $c_{2'}$ which are fixedly secured to the surfaces of these drums. The cutting blade $c_1$ is paired with the cutting blade $c_{1'}$, and the cutting blade $c_2$ is paired with the cutting blade $c_{2'}$. When a pair of cutting blades cut a steel piece, the obverses of the cutting blades are opposite in direction for each pair of cutting blades and the obverses of the blades of the pairs of cutting blades $c_1$ and $c_{1'}$ and the obverses of the blades of the pairs of cutting blades $c_2$ and $c_{2'}$ are also opposite in direction. In FIG. 6, the drums $d_1$, $d_2$ are rotatably secured to drum chucks disposed in a housing (not shown), and the upper drums rotate counterclockwise and the lower drums rotate clockwise so that the preceding steel piece and the succeeding steel piece are cut by a pair of cutting blades $c_1$, $c_{1'}$ fixedly secured to the surfaces of the drums $d_1$, $d_2$ and by the other pair of cutting blades $c_2$, $c_{2'}$ fixedly secured to the surfaces of the drums $d_1$, $d_2$, respectively, while they are transferred from the left side to the right side in the drawing.

For comparison, the cutting condition in the case of cutting the steel piece by a conventional drum shear is shown in FIGS. 7 (a), (b) and the cutting condition in the case of cutting the steel piece in accordance with the present invention is shown in FIGS. 8 (a), (b).

In the case of cutting the steel pieces with the same cutting blades as shown in FIGS. 7 (a), (b), it is generally difficult to make the warping directions as well as the amount of warp equal in the case of cutting the trailing end of the preceding steel piece and in the case of cutting the leading end of the succeeding steel piece. In the case of cutting process shown in FIGS. 8 (a), (b), however, it is possible to reduce the amount of the warp produced when the steel pieces are cut, hence, to make the displacement smaller by adjusting clearances of each pair of the cutting blades.

In the case of cutting the steel piece by a shear shown in FIG. 6 described above, while the cutting blades $c_1$, $c_{1'}$ and $c_2$, $c_{2'}$ can be used for cutting both preceding steel piece and succeeding steel piece, it is important to cut them so that they warp in the same direction.

As described above, when the ends of the preceding steel piece and the succeeding steel piece are cut by the cutting blades $c_1$, $c_{1'}$ and $c_2$, $c_{2'}$, respectively, they tend to warp as shown in FIG. 9 (a). Accordingly, they are thereafter heated to raise their temperatures and pressed against each other and thereby achieve a satisfactory joining as shown in FIG. 9 (b).

In this respect, the above described method may not sufficiently reduce the warp amount and there may be fluctuations in the warp amount, thereby leaving certain problem in terms of the operational reliability. Accordingly, the inventors conducted thorough investigations seeking for solutions of such a problem. Such investigations led the inventors to a recognition that, by performing the cutting at differential circumferential speeds, not only the warp amount but also the fluctuations of the warp amount can be reduced.

For example, the case of cutting the trailing end of the preceding steel piece S1 such that the trailing end of the preceding steel piece S1 warps upward is described with reference to FIG. 10. FIG. 10 shows a cutting condition just after the cutting blades bite into the steel piece when the steel piece is cut under the conditions of different circumferential speeds (the rate of the difference in the circumferential speeds is 5%) in which the traveling speed $V_f$ of the cutting blade which rotates with the reverse of the cutting blade facing forward is larger than the traveling speed $V_b$ of the cutting blade which rotates with the obverse of the cutting blade facing forward. The bending moment M in the case of cutting by the positive rate of difference in circumferential speeds (5%) is smaller than the bending moment M in the case of cutting at an equal circumferential speed shown in FIG. 4. This is because the traveling speed $V_f$ of the cutting blade which rotates with the reverse of the cutting blade facing forward is larger than the traveling speed of the other cutting blade. As a result, as shown in FIG. 10, a vertical plane including the tip O of the cutting blade is positioned on the reverse side of the other cutting blade and a vertical plane including the tip Q of the cutting blade is positioned on the reverse side of the other cutting blade and, therefore, the contact planes OP and QR of the cutting blades overlap each other (zone indicated by broken lines). Accordingly, the warp amount when the rate of difference in circumferential speeds is positive is very small.

On the other hand, the bending moment M in the case of cutting at a negative rate of difference in circumferential speeds is different from the case of cutting with positive rate of difference in circumferential speeds, in that it is larger than the bending moment M in the case of cutting under the conditions shown in FIG. 4.

FIG. 11 shows a cutting condition just after the cutting blades bite into the steel piece when the steel piece is cut under the conditions of the negative rate of difference in circumferential speeds (the rate of the difference in circumferential speeds is –5%) in which the traveling speed $V_f$ of the cutting blade which rotates with the reverse of the cutting blade facing forward is smaller than the traveling speed $V_b$ of the cutting blade which rotates with the obverse of the cutting blade facing forward. The cutting condition in the case of the negative rate of difference in circumferential speeds (–5%) is different from the cutting condition in the case of the positive rate of difference in circumferential speeds and the traveling speed $V_f$ of the cutting blade which rotates with the reverse of the cutting blade facing forward is smaller than the traveling speed of the other cutting blade. Therefore, as shown in FIG. 11, the vertical plane including the tip O of the cutting blade is positioned on the obverse side of one cutting blade, and the vertical plane including the tip Q of the cutting blade is positioned on the obverse side of the other cutting blade and the contact plane OP of the cutting blade is away from the contact plane QR of the cutting blade by the zone represented by the broken lines. The degree of warping is thus larger in the case of the negative rate of difference in circumferential speeds than in the case of the same circumferential speed. The cutting condition in the case of cutting the trailing end of the preceding steel piece has been described above. In the case of cutting the leading end of the succeeding steel piece, it is recommended that the cutting blade which rotates with the reverse of the cutting blade facing forward is located under the steel piece, and the cutting blade which rotates with the obverse of the cutting blade facing forward is located over the steel piece. It is further recommended that the traveling speed of the former cutting blade is made larger than the traveling speed of the latter cutting blade, so as to reduce the warp amount according to the cutting method of the present invention.

The relationship between the rate of difference in the circumferential speeds and the warp amount (curvature) in the case of cutting the steel pieces so that the trailing end of the preceding steel piece and the leading end of the succeeding steel piece warp upward, respectively, is shown in FIG. 12. The rate of the difference in the circumferential speed f is calculated by the equation, as in the case described above, $f=(V_f-V_b)/V_b \times 100\%$, where $V_f$ is the traveling speed of the cutting blade which rotates with the reverse of the cutting blade facing forward, and $V_b$ is the traveling speed of the cutting blade which rotates with the obverse of the cutting blade facing forward.

It is advantageous for the rate of the difference in circumferential speeds to be less than 5% in the case of cutting the steel piece at different circumferential speed. This is because, as shown in FIG. 12, the larger the rate of difference in the circumferential speeds is, the smaller the warp amount of the steel piece is, though when the rate of difference in the circumferential speeds is more than 5%, the amount of projection at the end of the steel piece shown in FIG. 13 (i.e., the length from the end plane to the maximum projecting end in the supposed rectangle which is equal to the same area of the cut end) becomes large as shown in FIG. 14 so that there may be produced defective joining even when a transverse-type high-frequency induction heating process is used, in which an alternate magnetic field is applied at the end of the steel piece in the thickness direction to heat the steel piece (the allowable amount of projection is about 5 mm). In particular, when the rate of difference in the circumferential speeds is set at 2–3%, the warp amount can be made smaller and worse shape at the joined plane can be prevented.

Since the warp of the succeeding steel piece tends to be larger than the warp of the preceding steel piece, assuming that the preceding steel piece and the succeeding steel piece are cut at different circumferential speeds, it is advantageous that the rate of difference in the circumferential speeds when cutting the succeeding steel piece is made larger than the rate of difference in circumferential speeds when cutting the preceding steel piece, in order to reduce the difference of warp in both cases.

The shape of the end of the steel piece when the steel piece is cut by the drums rotating at the same circumferential speed and the shape of the end of the steel piece when the steel piece is cut by the drums rotating at the different circumferential speeds are shown in FIGS. 15 (a), (b) for comparison (the warp is not shown in the drawing).

Cutting at the different circumferential speeds is realized by controlling the rotating speed of the rotating drum or by adjusting at least one of the height of the cutting blades disposed on the upper and lower rotating drums and the diameter of the drums.

FIG. 16 shows another example of the structure of a drum-type crop shear suitable for carrying out the present invention. This crop shear is disposed on the obverse side and the reverse side of the steel piece, and comprises drums $d_1$, $d_2$ for cutting the trailing end of the preceding steel piece, cutting blades $c_1$, $c_{1'}$ fixedly secured to the surfaces of these drums, drums $d_3$, $d_4$ for cutting the leading end of the succeeding steel piece, and cutting blades $c_2$, $c_{2'}$ fixedly secured to the surfaces of these drums.

When the pairs of cutting blades $c_1$, $c_{1'}$ and $c_2$, $c_{2'}$ cut the steel piece, the obverses of the cutting blades are oriented opposite in direction for each pair of cutting blades and the obverses of the blades of the pairs of cutting blades $c_1$, $c_{1'}$ are oriented opposite in direction to the obverses of the blades of the pairs of cutting blades $c_2$, $c_{2'}$.

Reference numerals 3, 4 in FIG. 16 designate housings for accommodating the drums $d_1$, $d_2$ and $d_3$, $d_4$ which are rotatably mounted on the drum chucks in the housings 3, 4 so that the steel piece is cut by the cutting blades while it is transferred from the left side to the right side in the drawing.

When the ends of the preceding steel piece and the succeeding steel piece are cut by the cutting blades $c_1$, $c_{1'}$ and $c_2$, $c_{2'}$ at the different circumferential speeds, respectively, the ends of the steel piece tend to warp in the same direction and the warp amount is very small. Accordingly, the ends of the steel pieces are heated to raise their temperatures and pressed against each other with a minimized displacement, thereby preventing the rolled plate from being broken during the rolling.

Moreover, in the case of cutting the steel piece with a shear shown in FIG. 6 and described above, it is necessary to make a time allowance for synchronizing the cutting portion of the succeeding steel piece to the position of the cutting blades of the drum shear before cutting the leading end of the succeeding steel piece after cutting the trailing end of the preceding steel piece. In this connection, as shown in FIG. 16, the drum shear makes it possible to freely determine the timing of cutting the trailing end of the preceding steel piece and the timing of cutting the leading end of the following by the drums $d_1$, $d_2$ and $d_3$, $d_4$, respectively. Therefore, the drum shear is particularly advantageous in that the time interval required for cutting can be reduced.

FIG. 17 shows one example of a continuous hot rolling equipment for steel pieces, which is provided with a cutting device having a structure shown in FIG. 6.

In the drawing, reference numeral 5 designates a roughing mill, and reference numeral 6 designates a cutting device for cutting the ends of the preceding steel piece $s_1$ and the succeeding steel pieces $s_2$. Reference numeral 7 designates a joining device for heating the cut ends of steel pieces to raise their temperatures by high-frequency induction heating and joining both steel pieces by pressing them during or after heating, reference numeral 8 designates a scale breaker, and reference numeral 9 designates a finishing mill train for continuously hot finish rolling the joined steel piece.

In the equipment having the above-mentioned structure, in particular, a high-frequency heating means of the joining device 7 comprises a transverse-type induction heating coil which has a pair of upper and lower magnetic poles sandwiching the sheet bar in its thickness direction and is adapted to apply an alternate magnetic field between the magnetic poles to heat the steel piece and raise the temperature thereof.

When the induction heating coil like this is adopted, as described above, it may be difficult to sandwich and press the end of the steel piece with a clamp due to an installation space for the induction heating coil and thus a clamp is used which comprises jaw members for clamping the preceding steel piece and the succeeding steel piece and projects toward the end of the steel piece.

In particular, it is highly advantageous for each of the jaw members to be provided with cutout portion which is cut out like a comb at predetermined intervals along the width direction of the steel piece in the region passed by the magnetic flux, or additionally with an insulating material covering the steel pieces.

EMBODIMENT 1

By using a hot rolling equipment shown in FIG. 17, a sheet bar (steel grade: low carbon steel) of 1600 mm in width, 30 mm in thickness was cut, heated and pressed and thereby joined in the following manner, before it was rolled to a finish gage of 1.5–5 mm, and the rolled plate was checked for breakage during rolling.

Comparative Example 1

A preceding sheet bar and a successive sheet bar were cut by a drum shear rotating at the same circumferential speed and shown in FIG. 3 (warp condition of the preceding sheet bar—radius of curvature r: about 2000 mm, warp amount d: about 30 mm, warp length L: about 400 mm; and warp condition of the successive sheet bar—radius of curvature r: about 1000 mm, warp amount d: about 50 mm, warp length L: about 600 mm, see FIG. 7). The cut portions were then heated by a joining device for about 10 seconds (high-frequency induction heating, heating conditions: output 1000 Hz, rate of heating 100° C./sec) to melt the surface to be joined and then both sheet bars were pressed against each other and thereby joined (in this case, pressing force: 100 ton f, displacement amount: about 5–8 mm). The joined sheet bars were then supplied to a finish rolling mill train via a scale breaker (inter-stand tension of front stands were set at 0.5–1 kgf/mm$^2$ and those of rear stands were set at 1–1.5 kgf/mm$^2$, reduction in thickness of No. 1–3 stands: 30–50%, reduction in thickness of No. 4–7 stands: 15–30%). As a result, the rolled plates of not more than 2 mm in a finish gage were frequently broken at joined portion thereof between the rear rolling mill stands and, in particular, for the rolled plate of 1.5 mm in a finish gage, the ratio of the rolled plates passing through the rolling mills without breakage was less than 90%.

Inventive Example 1

A preceding sheet bar and a succeeding sheet bar were cut by a drum shear rotating at the same circumferential speed and shown in FIG. 6 (the warp condition of the preceding sheet bar was the same as those of the Comparative Example 1; the warp condition of the succeeding sheet bar—radius of curvature r: about 1000 mm, warp amount d: about 50 mm (the direction of the warp is opposite to that of the comparative example), warp length L: about 600 mm, see FIG. 9). The cut portions were then heated by a joining device for about 10 seconds (high-frequency induction heating, heating condition was the same as that of Comparative Example 1) to melt the surface to be joined and then both sheet bars were pressed against each other and thereby joined (in this case, pressing force: 100 ton f, displacement amount: about 0–2 mm). The joined sheet bars were then rolled to a finish gage of 1.5–5 mm (the rolling condition was the same as that of the Comparative Example 1). As a result, one hundred sheet bars of 1.5 mm in a finish gage were rolled without any breakage during rolling and thus it was verified that continuous hot rolling was stably implemented by the method according to the invention.

Inventive Example 2

A preceding sheet bar and a succeeding sheet bar were cut by a drum shear rotating at the same circumferential speed and shown in FIG. 16 (the warp conditions of the preceding sheet bar and the succeeding sheet bar were the same as those of Compatible Example 1). The cut portions were then heated by a joining device for about 10 seconds (high-frequency induction heating, the heating condition was the same as that of Compatible Example 1) to melt the plane to be joined. The both sheet bars were then pressed against each other and thereby joined (in this case, the pressing force: 100 tonf, the amount of displacement: about 0–2 mm). The joined sheet bars were then rolled to a finish gage of 1.5–5 mm (the rolling condition was the same as that of Comparative Example 1). As a result, one hundred sheet bars of 1.5 mm in a finish gage were rolled without any breakage during rolling and thus it was verified that continuous hot rolling was stably implemented by the method according to the invention.

EMBODIMENT 2

By using a hot rolling equipment shown in FIG. 17, sheet bars (steel grade:low carbon steel) of 1200 mm in width, 30 mm in thickness were cut, heated and pressed against each other and thereby joined in the following manner. The joined sheet bars were then rolled to a finish gage of 0.8–5 mm and the rolled plate was checked for breakage during rolling.

Comparative Example 2

A preceding sheet bar and a succeeding sheet bar were cut by a drum shear rotating at the same circumferential speed and shown in FIG. 3 (the warp condition of the preceding sheet bar—radius of curvature r: about 2000 mm, warp amount d: about 30 mm, warp length L: about 400 mm; the warp condition of the succeeding sheet bar—radius of curvature r: about 1000 mm, warp amount d: about 50 mm, warp length L: about 600 mm, see FIG. 7). The cut portions were then heated by a joining device for about 10 seconds (high-frequency induction heating, heating condition: output 1000 Hz, rate of heating 100° C./sec) to melt the surface to be joined and then the both sheet bars were pressed against each other and thereby joined (in this case, pressing force: 75 tonf, displacement amount: about 5–8 mm). The joined sheet bars were then supplied to a finish rolling mill train via a scale breaker (inter-stand tension of the front stands was set at 0.5–1 kgf/mm$^2$ and that of the rear stands was set at 1–1.5 kgf/mm$^2$, reduction in thickness of No. 1–3 stands: 30–50%, reduction in thickness of No. 4–7 stands: 15–30%). As a result, it was found that the rolled plates of less than 2 mm in a finish gage were frequently broken at the joined portion thereof between the rear rolling mill stands and, in particular, for the rolled plate of 1.5 mm in a finish gage, the ratio of the rolled plates passing through the rolling mills without breakage was less than 90%.

Inventive Example 3

A preceding sheet bar and a succeeding sheet bar were cut by a drum shear shown in FIG. 18 (the rotating angular speed of the upper drum was the same as that of the lower drum and the radii r of the cutting blades of the upper drum and the lower drum were in the relationship of $r_{f1}/r_{b1}=1.02$ (the rate of difference in circumferential speeds was 2%) in the case of cutting the preceding sheet bar and they were in the relationship of $r_{f2}/r_{b2}=1.04$ (the rate of difference in circumferential speeds was 4%) in the case of cutting the succeeding sheet bar) (the warp condition of the preceding sheet bar—upward warp, curvature 0.4 m$^{-1}$ (radius of curvature 2500 mm), warp amount 25 mm, amount of projection 4 mm, the warp condition of the succeeding sheet bar—upward warp, curvature 0.7 m$^{-1}$ (radius of curvature 1400 mm), warp amount 30 mm, projection amount 4 mm). The cut portions were then heated by a joining device for about 10 seconds (high-frequency induction heating, the heating condition was the same as that of Comparative Example 2) to melt the surface to be joined and then both sheet bars were pressed against each other and thereby joined (in this case, pressing force: 75 tonf, displacement amount: about 0–1 mm). The sheet bars were then rolled to a finish gage of 0.8–5 mm (rolling condition was the same as that of Comparative Example 2). As a result, one hundred sheet bars of 0.8 mm in a finish gage were rolled without any breakage during rolling and thus it was verified that continuous hot rolling was stably implemented by the method according to the invention.

Although the above description relates to a case in which the sheet bar warped upward and the warp amount was made small when the sheet bar was cut, it is needless to say that the present invention can be applied to a case in which the sheet bar warps downward and the warp amount is made small when the sheet bar is cut.

INDUSTRIAL APPLICABILITY

Since the displacement produced in the case of joining the steel pieces by using transverse-type high-frequency induction heating can be made extremely small in accordance with the present, continuous hot rolling can be stably carried out without breakage of the sheet bars.

What is claimed is:

1. A continuous hot rolling method for continuously hot finish rolling steel pieces, comprising the steps of: cutting a trailing end of a preceding steel piece and a leading end of a succeeding steel piece with a drum shear which sandwiches the steel piece between an upper drum and a lower drum, having cutting blades on the outer peripheries of said drums; heating the cut ends and raising the temperatures thereof by high-frequency induction heating; pressing the cut ends each other to butt-join the cut ends against; and supplying the joined steel pieces to a rolling equipment, in which the trailing end of the preceding steel piece and the leading end of the succeeding steel piece are cut individually by two pairs of the cutting blades, one pair of the cutting blades having the obverses of the blades in opposite directions in the obverse side and the reverse side of the steel piece, and another pair of the cutting blades having the obverses of the blades in opposite directions relative to the former pair of cutting blades, while the steel pieces are transferred to the same direction.

2. A continuous hot rolling method for continuously hot finish rolling steel pieces as claimed in claim 1, in which the steel piece is cut by two pairs of the cutting blades mounted on one drum shear.

3. A continuous hot rolling method for continuously hot finish rolling steel pieces as claimed in claim 1, in which the steel piece is cut by two pairs of the cutting blades mounted on two drum shears disposed in tandem along the transfer direction of the sheet bar.

4. A continuous hot rolling method for continuously hot finish rolling steel pieces as claimed in claim 1, in which the preceding steel piece and the succeeding steel piece are cut under the conditions of different peripheral speed where, of the cutting blades disposed in the obverse side or the reverse side of the steel piece, a traveling speed of the cutting blades rotating with reverse of the cutting blades facing forward is made larger than a traveling speed of the cutting blades rotating with obverse of the cutting blades facing forward.

5. A continuous hot rolling method for continuously hot finish rolling steel pieces as claimed in claim 4, in which the steel piece is cut at the rate of difference in circumferential speeds of not more than 5%.

* * * * *